(12) United States Patent
Nieto

(10) Patent No.: US 6,457,755 B1
(45) Date of Patent: Oct. 1, 2002

(54) CAR DOOR PROTECTIVE DEVICE

(76) Inventor: Robert A. Nieto, 736 F St., Chula Vista, CA (US) 91910

( * ) Notice: Subject to any disclaimer, the term of this patent is extended or adjusted under 35 U.S.C. 154(b) by 0 days.

(21) Appl. No.: 09/939,028

(22) Filed: Aug. 24, 2001

(51) Int. Cl.[7] .............................................. B60R 19/42
(52) U.S. Cl. ..................................................... 293/128
(58) Field of Search .................... 293/128, 21; 296/188, 296/207, 95.1

(56) References Cited

U.S. PATENT DOCUMENTS

| | | | | |
|---|---|---|---|---|
| 2,994,356 A | * | 8/1961 | Flemming .................... | 293/128 |
| 3,610,684 A | * | 10/1971 | Richter ........................ | 293/128 |
| 3,704,037 A | * | 11/1972 | Glassberg .................... | 293/128 |
| 4,530,519 A | * | 7/1985 | Marshall ...................... | 293/128 |
| 4,531,560 A | * | 7/1985 | Balanky ....................... | 293/128 |
| 4,571,903 A | | 2/1986 | Strassner | |
| 4,643,471 A | * | 2/1987 | Fishback ..................... | 293/128 |
| 4,707,009 A | * | 11/1987 | Barnett ....................... | 293/128 |
| 4,750,767 A | * | 6/1988 | Barnett ....................... | 293/128 |
| D308,848 S | | 6/1990 | Genicoff | |
| 4,974,892 A | * | 12/1990 | Huard ......................... | 293/128 |
| 5,050,925 A | * | 9/1991 | Brown ........................ | 293/128 |
| 5,112,092 A | * | 5/1992 | Pucci .......................... | 293/128 |
| 5,129,695 A | * | 7/1992 | Norman, II ................. | 293/128 |
| 5,779,992 A | * | 7/1998 | Higashi ....................... | 208/210 |
| 6,062,617 A | * | 5/2000 | Marks ......................... | 293/128 |
| 6,179,354 B1 | * | 1/2001 | Bennett ....................... | 293/128 |

FOREIGN PATENT DOCUMENTS

| | | | |
|---|---|---|---|
| FR | 2 564 393 | * | 5/1984 |
| JP | 286367 | * | 11/1993 |

* cited by examiner

*Primary Examiner*—Kiran Patel

(57) ABSTRACT

A car door protecting device for preventing dents and scratches to car doors. The car door protecting device includes a panel having a first side, a second side, a top edge, a bottom edge, and a pair of side edges. The panel comprises a resiliently flexible material. A plate is attached to and extends along the bottom edge. The plate is orientated generally perpendicular to the bottom edge and generally facing the second side of the panel. The plate is positioned under a bottom portion of the door and the top edge of the panel is extended through a window of the door such that the window may be closed on the proximal portion. The panel generally covers the outer surface of the door.

4 Claims, 4 Drawing Sheets

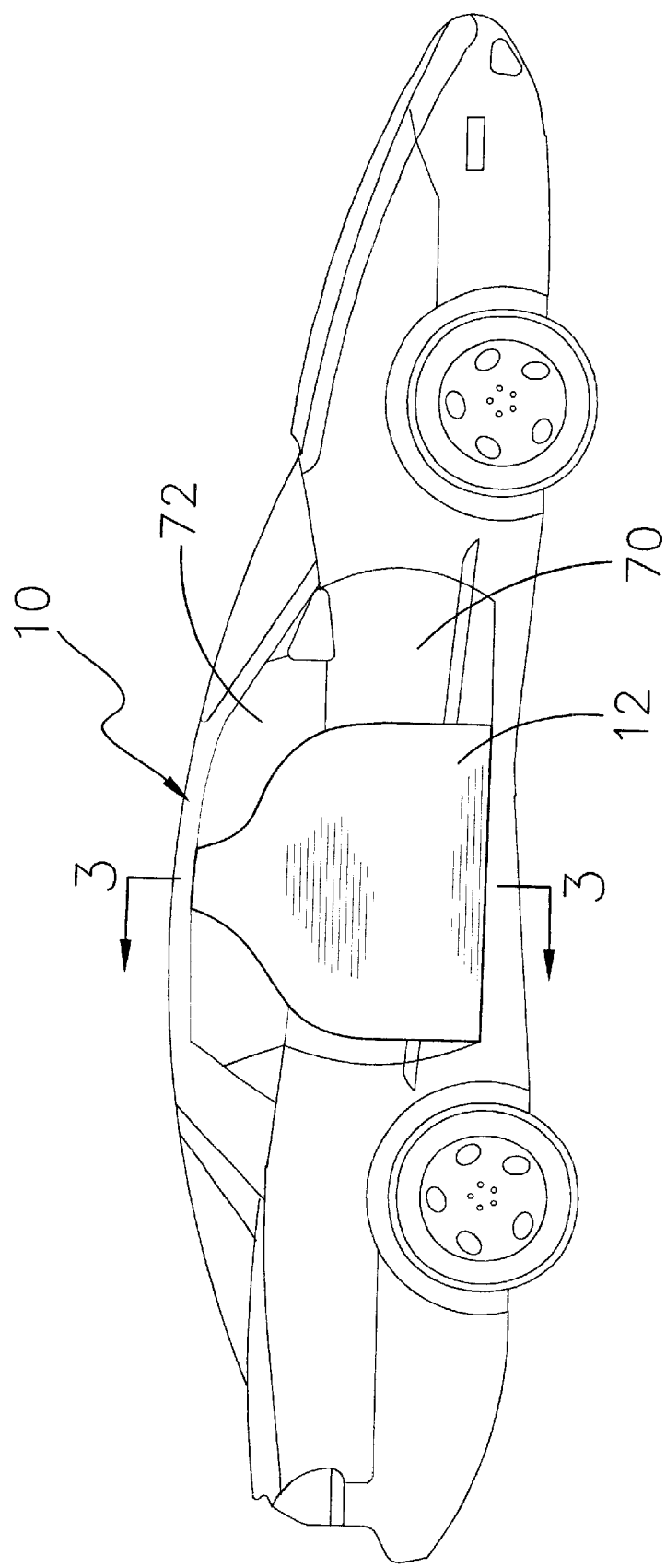

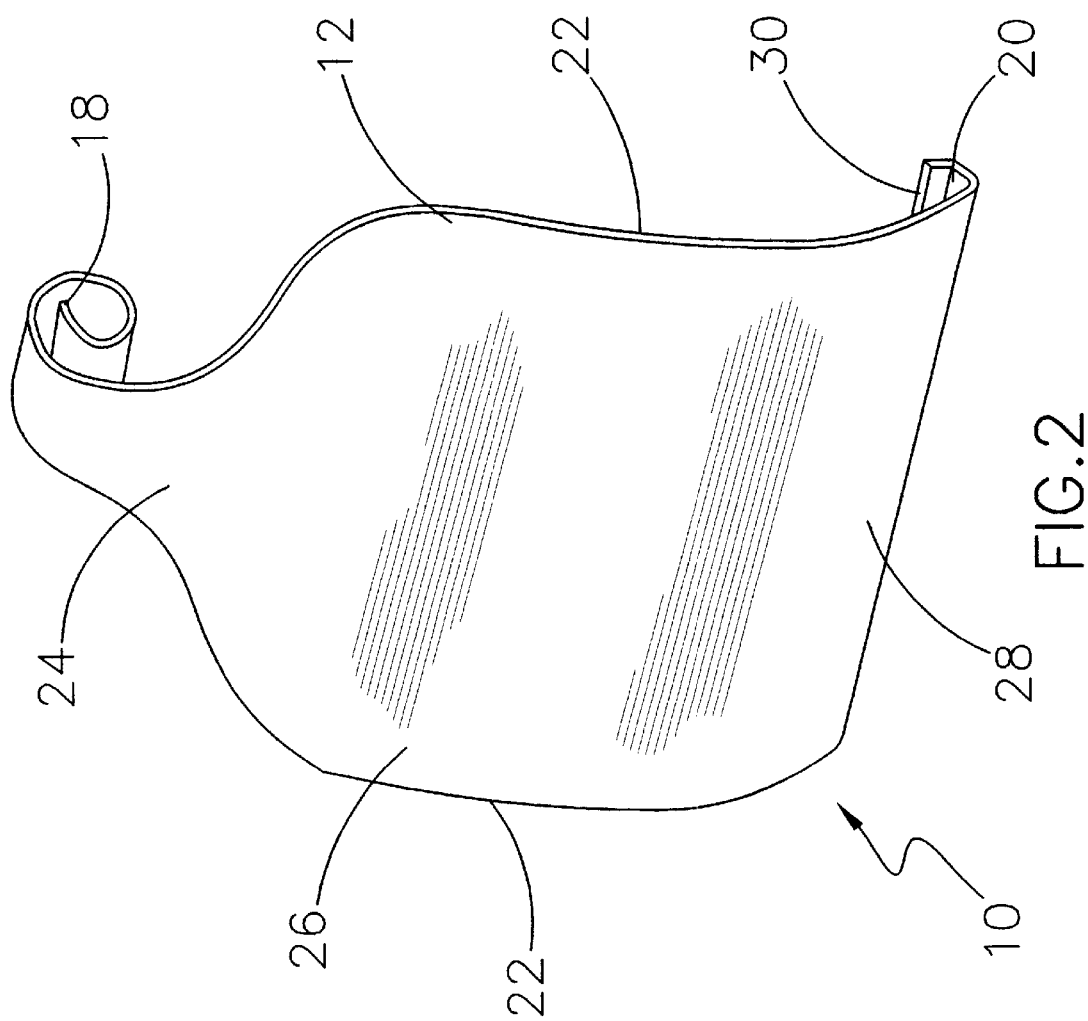

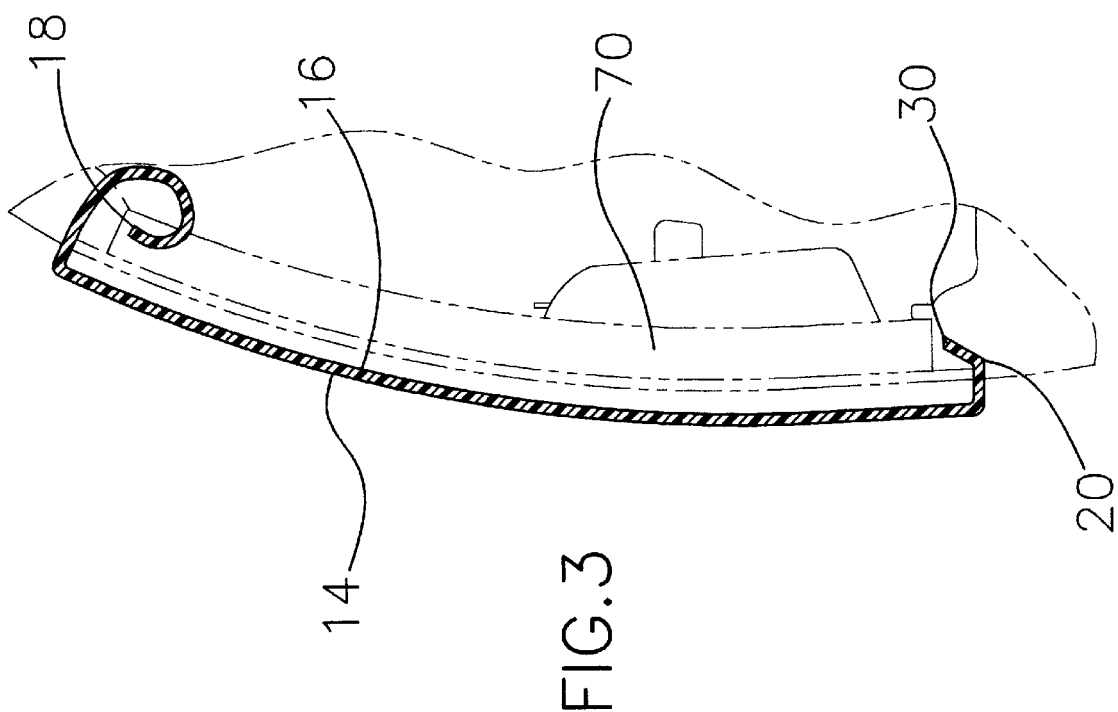

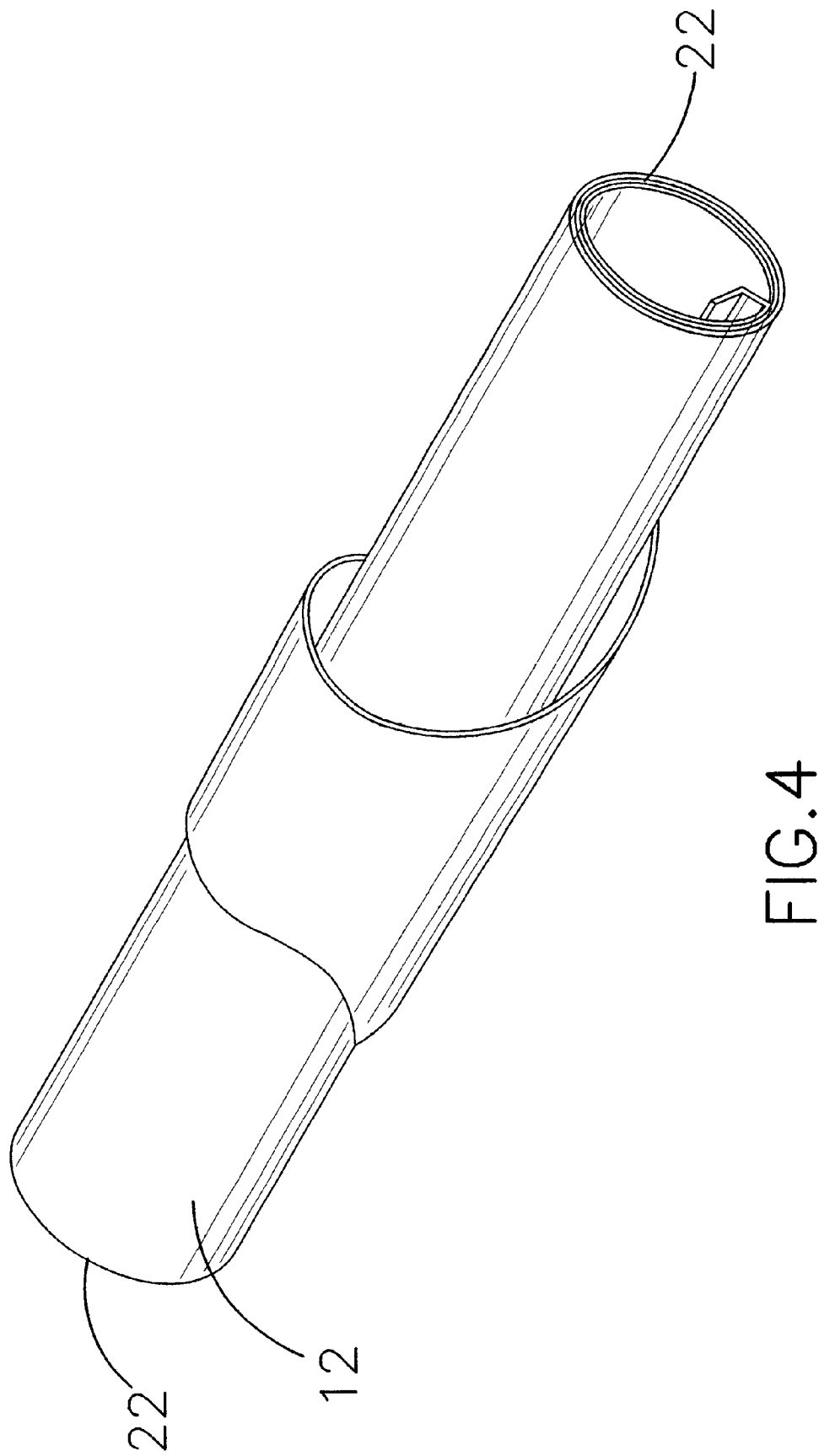

CAR DOOR PROTECTIVE DEVICE

BACKGROUND OF THE INVENTION

1. Field of the Invention

The present invention relates to dent preventing devices and more particularly pertains to a new car door protecting device for preventing dents and scratches to car doors.

2. Description of the Prior Art

The use of dent preventing devices is known in the prior art. More specifically, dent preventing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,571,903; 4,750,767; 4,530,519; 5,129,695; 5,112,092; and U.S. Des. Pat. No. 308,848.

While these devices fulfill their respective, particular objectives and requirements, the aforementioned patents do not disclose a new car door protecting device. The inventive device includes a panel having a first side, a second side, a top edge, a bottom edge, and a pair of side edges. The panel comprises a resiliently flexible material. A plate is attached to and extends along the bottom edge. The plate is orientated generally perpendicular to the bottom edge and generally facing the second side of the panel. The plate is positioned under a bottom portion of the door and the top edge of the panel is extended through a window of the door such that the window may be closed on the proximal portion. The panel generally covers the outer surface of the door.

In these respects, the car door protecting device according to the present invention substantially departs from the conventional concepts and designs of the prior art, and in so doing provides an apparatus primarily developed for the purpose of preventing dents and scratches to car doors.

SUMMARY OF THE INVENTION

In view of the foregoing disadvantages inherent in the known types of dent preventing devices now present in the prior art, the present invention provides a new car door protecting device construction wherein the same can be utilized for preventing dents and scratches to car doors.

The general purpose of the present invention, which will be described subsequently in greater detail, is to provide a new car door protecting device apparatus and method which has many of the advantages of the dent preventing devices mentioned heretofore and many novel features that result in a new car door protecting device which is not anticipated, rendered obvious, suggested, or even implied by any of the prior art dent preventing devices, either alone or in any combination thereof.

To attain this, the present invention generally comprises a panel having a first side, a second side, a top edge, a bottom edge, and a pair of side edges. The panel comprises a resiliently flexible material. A plate is attached to and extends along the bottom edge. The plate is orientated generally perpendicular to the bottom edge and generally facing the second side of the panel. The plate is positioned under a bottom portion of the door and the top edge of the panel is extended through a window of the door such that the window may be closed on the proximal portion. The panel generally covers the outer surface of the door.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new car door protecting device apparatus and method which has many of the advantages of the dent preventing devices mentioned heretofore and many novel features that result in a new car door protecting device which is not anticipated, rendered obvious, suggested, or even implied by any of the prior art dent preventing devices, either alone or in any combination thereof.

It is another object of the present invention to provide a new car door protecting device which may be easily and efficiently manufactured and marketed.

It is a further object of the present invention to provide a new car door protecting device which is of a durable and reliable construction.

An even further object of the present invention is to provide a new car door protecting device which is susceptible of a low cost of manufacture with regard to both materials and labor, and which accordingly is then susceptible of low prices of sale to the consuming public, thereby making such car door protecting device economically available to the buying public.

Still yet another object of the present invention is to provide a new car door protecting device which provides in the apparatuses and methods of the prior art some of the advantages thereof, while simultaneously overcoming some of the disadvantages normally associated therewith.

Still another object of the present invention is to provide a new car door protecting device for preventing dents and scratches to car doors.

Yet another object of the present invention is to provide a new car door protecting device which includes a panel having a first side, a second side, a top edge, a bottom edge, and a pair of side edges. The panel comprises a resiliently flexible material. A plate is attached to and extends along the bottom edge. The plate is orientated generally perpendicular to the bottom edge and generally facing the second side of the panel. The plate is positioned under a bottom portion of the door and the top edge of the panel is extended through a window of the door such that the window may be closed on the proximal portion. The panel generally covers the outer surface of the door.

Still yet another object of the present invention is to provide a new car door protecting device that is retrofittable to existing automobiles and transferable between multiple automobiles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic front in-use view of a new car door protecting device according to the present invention.

FIG. 2 is a schematic perspective view of the present invention. FIG. 3 is a schematic cross-sectional view taken along line 3—3 of FIG. 1 of the present invention.

FIG. 4 is a schematic perspective view of the present invention.

DESCRIPTION OF THE PREFERRED EMBODIMENT

With reference now to the drawings, and in particular to FIGS. 1 through 4 thereof, a new car door protecting device embodying the principles and concepts of the present invention and generally designated by the reference numeral 10 will be described.

As best illustrated in FIGS. 1 through 4, the car door protecting device 10 generally comprises a panel 12 having a first side 14, a second side 16, a top edge 18, a bottom edge 20, and a pair of side edges 22. The panel 12 has a proximal portion 24, a middle portion 26 and a distal portion 28 with respect to the top edge 18. A width of the panel 12 extending between the side edges 22 of the proximal portion 24 decreases from the middle portion 26 to the top edge 18. The middle portion 26 has a width preferably between 30 inches and 40 inches and the top edge 18 has a length preferably between 5 inches and 10 inches. The panel 12 preferably has a length from the top edge 18 to the bottom edge 20 between 3.5 feet and 4.5 feet. The panel 12 comprises a resiliently flexible material which is preferably vinyl. The proximal portion 24 rolls toward the second side 16 for storage purposes as shown in FIG. 4 and to form a loop as shown in FIG. 3 such that device 10 is not easily removed from a car door 70 from the outside.

A plate 30 is attached to and extends along the bottom edge 20. The plate 30 is orientated generally perpendicular to the bottom edge 20 and generally faces the second side 16 of the panel 12.

In use, the plate 30 is positioned under a bottom portion of the door 70 and the top edge 18 of the panel 12 is extended through a window 72 of the door 70 such that the window 72 may be closed on the proximal portion 24. The panel 12 generally covers the outer surface of the door 70. The panel 12 protects the door 70 from other car doors and also shades the interior of the car from sunlight.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A car door protection device comprising:
   a panel having a first side, a second side, a top edge, a bottom edge, and a pair of side edges, said panel comprising a resiliently flexible material;
   a plate being attached to and extending along said bottom edge, said plate being orientated generally perpendicular to said bottom edge and generally facing said second side of said panel; and
   wherein said plate is positioned under a bottom portion of the door and the top edge of the panel is extended through a window of the door such that the window may be closed on the proximal portion, wherein said panel generally covers the outer surface of the door.

2. The car door protection device as in claim 1, wherein said panel has a proximal portion, a middle portion and a distal portion with respect to said top edge, a width of said panel extending between said side edges of said proximal portion decreasing from said middle portion to said top edge.

3. The car door protection device as in claim 2, wherein said middle portion having a width generally between 30 inches and 40 inches, said top edge having a length generally between 5 inches and 10 inches, said panel comprising a resiliently flexible material.

4. A car door protection device comprising: a panel having a first side, a second side, a top edge, a bottom edge, and a pair of side edges, said panel having a proximal portion, a middle portion and a distal portion with respect to said top edge, a width of said panel extending between said side edges of said proximal portion decreasing from said middle portion to said top edge, said middle portion having a width generally between 30 inches and 40 inches, said top edge having a length generally between 5 inches and 10 inches, said panel comprising a resiliently flexible material, said proximal portion rolling toward said second side;

a plate being attached to and extending along said bottom edge, said plate being orientated generally perpendicular to said bottom edge and generally facing said second side of said panel; and wherein said plate is positioned under a bottom portion of the door and the top edge of the panel is extended through a window of the door such that the window may be closed on the proximal portion, wherein said panel generally covers the outer surface of the door.

* * * * *